US012700387B2

(12) United States Patent
Wish

(10) Patent No.: US 12,700,387 B2
(45) Date of Patent: *Aug. 4, 2026

(54) CONVERTIBLE DRUM KIT

(71) Applicant: MUSIC WILL, INC., Covina, CA (US)

(72) Inventor: David Wish, Montclair, NJ (US)

(73) Assignee: MUSIC WILL, INC., Covina, CA (US)

( * ) Notice: Subject to any disclaimer, the term of this patent is extended or adjusted under 35 U.S.C. 154(b) by 845 days.

This patent is subject to a terminal disclaimer.

(21) Appl. No.: 17/828,364

(22) Filed: May 31, 2022

(65) Prior Publication Data

US 2023/0386434 A1 Nov. 30, 2023

(51) Int. Cl.
| | |
|---|---|
| *G10D 13/10* | (2020.01) |
| *F16M 13/02* | (2006.01) |
| *G10D 13/02* | (2020.01) |
| *G10D 13/065* | (2020.01) |
| *G10D 13/11* | (2020.01) |

(52) U.S. Cl.
CPC ........... *G10D 13/28* (2020.02); *F16M 13/022* (2013.01); *G10D 13/02* (2013.01); *G10D 13/065* (2013.01); *G10D 13/11* (2020.02)

(58) Field of Classification Search
CPC ...... G10D 13/28; G10D 13/02; G10D 13/065; G10D 13/11; F16M 13/022
See application file for complete search history.

(56) References Cited

U.S. PATENT DOCUMENTS

2023/0395043 A1* 12/2023 Wish ...................... G10D 13/11

* cited by examiner

*Primary Examiner* — Kimberly R Lockett
(74) *Attorney, Agent, or Firm* — Vedder Price P.C.

(57) ABSTRACT

A drum set comprising a cajon, a convertible top module and a convertible bottom module is provided. The cajon can have a top side, a bottom side, a striking side, an opposing resonant side, and two other sides. The top module can include a top mounting member removably attached over the top side of the cajon, the top mounting member has at least two top clamps configured to clamp at least two sides of the cajon. The top module also has a plurality of upward extending component mounting shafts removably attached to the top mounting member. The top module has one or more percussion modules configured to removably attach to one or more of the plurality of component mounting shafts. The bottom module can include a bottom mounting member removably attached under the bottom side of the cajon. The bottom mounting member has at least two bottom clamps configured to clamp at least two sides of the cajon. A drum kick assembly can be removably attached to the bottom mounting member and positioned on the striking side of the cajon and including a beater positioned to strike the striking side of the cajon to produce a sound. A hi-hat pedal assembly can be removably attached to the bottom mounting member and positioned on the resonant side of the cajon.

21 Claims, 20 Drawing Sheets

CONVERTIBLE DRUM KIT

CROSS-REFERENCE TO RELATED APPLICATIONS

This application is related to U.S. patent application Ser. No. 17/236,793, filed on Apr. 21, 2021, which is a continuation-in-part of U.S. patent application Ser. No. 17/152,682, filed on Jan. 19, 2021, which is a continuation of U.S. patent application Ser. No. 16/867,519, filed on May 5, 2020, now U.S. Pat. No. 10,896,662, which is a continuation-in-part of U.S. patent application Ser. No. 16/025,876, filed on Jul. 2, 2018, now U.S. Pat. No. 10,714,061, which is a continuation of U.S. patent application Ser. No. 15/430,431, filed on Feb. 10, 2017, now U.S. Pat. No. 10,013,960. All of the above applications are incorporated herein by reference in their entirety.

FIELD

This disclosure relates generally to musical instruments and more specifically relates to a cajon based drum set or kit with convertible modules.

BACKGROUND

In recent years, cajons are becoming popular in a variety of musical types, such as blues, rock n roll, funk, jazz, etc. A Cajon is a box-shaped percussion instrument having multiple faces. The front or rear face of the cajon generally includes a thin plywood. The cajon can be played by slapping on one or more faces of the cajon with hands, fingers, brushes, mallets, or sticks. A drummer can play the cajon by sitting astride the cajon while striking the front or rear face of the cajon between the percussionist's knees. In addition, a drummer can play the cajon with the cajon tilted at an angle with the ground.

A cajon can be used as a bass drum by bands instead of a full drum kit when performing in simple settings, as the cajon can simultaneously serve as both a bass drum and a seat for the drummer. Alternatively, a cajon can be used with a bass drum pedal, thus turning the cajon into an indirect percussion instrument which can be played with a single foot. This enables the drummer to beat the cajon just like a pedal-bass drum, thus leaving the hands and the other foot free to play other instruments.

A drum kit, drum set, trap set, or just drums is a collection of drums and other percussion instruments set up to be played/struck by a single percussionist. The traditional drum kit consists of a mix of drums (classified as classically as membranophones, Hornbostel-Sachs high-level classification 2) and idiophones (Hornbostel-Sachs high-level classification 1, most significantly cymbals but also including the woodblock and cowbell for example). Traditional drum sets are very large and comprise both a large number of components and components, many of which, are large in size. Traditional drum sets are not ideal for students because drum sets are both expensive and they take up a lot of space. Traditional drum sets are also not ideal for a classroom setting, where the goal is to teach students how to play the drums. More recently kits have also included electronic instruments (Hornbostel-Sachs classification 53), with both hybrid and entirely electronic kits now in common use.

A standard modern kit, as used in popular music and taught in many music schools, contains: a snare drum, mounted on a stand, placed between the player's knees and played with drum sticks (which may include rutes or brushes); a bass drum, played by a pedal operated by the right foot; and one or more cymbals, played with the sticks.

All of these are classed as non-pitched percussion, allowing for the music to be scored using percussion notation, for which a loose semi-standardized form exists for the drum kit. If some or all of them are replaced by electronic drums, the scoring and most often positioning remains the same, allowing a standard teaching approach. The drum kit is usually played seated on a drum stool or throne. The drum kit differs in general from those traditional instruments that produce melody or chords/pitch per se: even though drums are often placed musically alongside others that do, such as the piano or stringed instruments.

Many drummers extend their kits from this basic pattern, adding more drums, more cymbals, and many other instruments including pitched percussion. In some styles of music particular extensions are normal, for example double bass drums in heavy metal music. On the other extreme but more rarely, some performers omit elements from even the basic setup, also dependent on the style of music and individual preferences.

SUMMARY

The present disclosure provides a family or series of drum sets built by a variety of cajons with convertible top and bottom modules.

DESCRIPTION OF EXEMPLARY EMBODIMENTS

Figure 1:
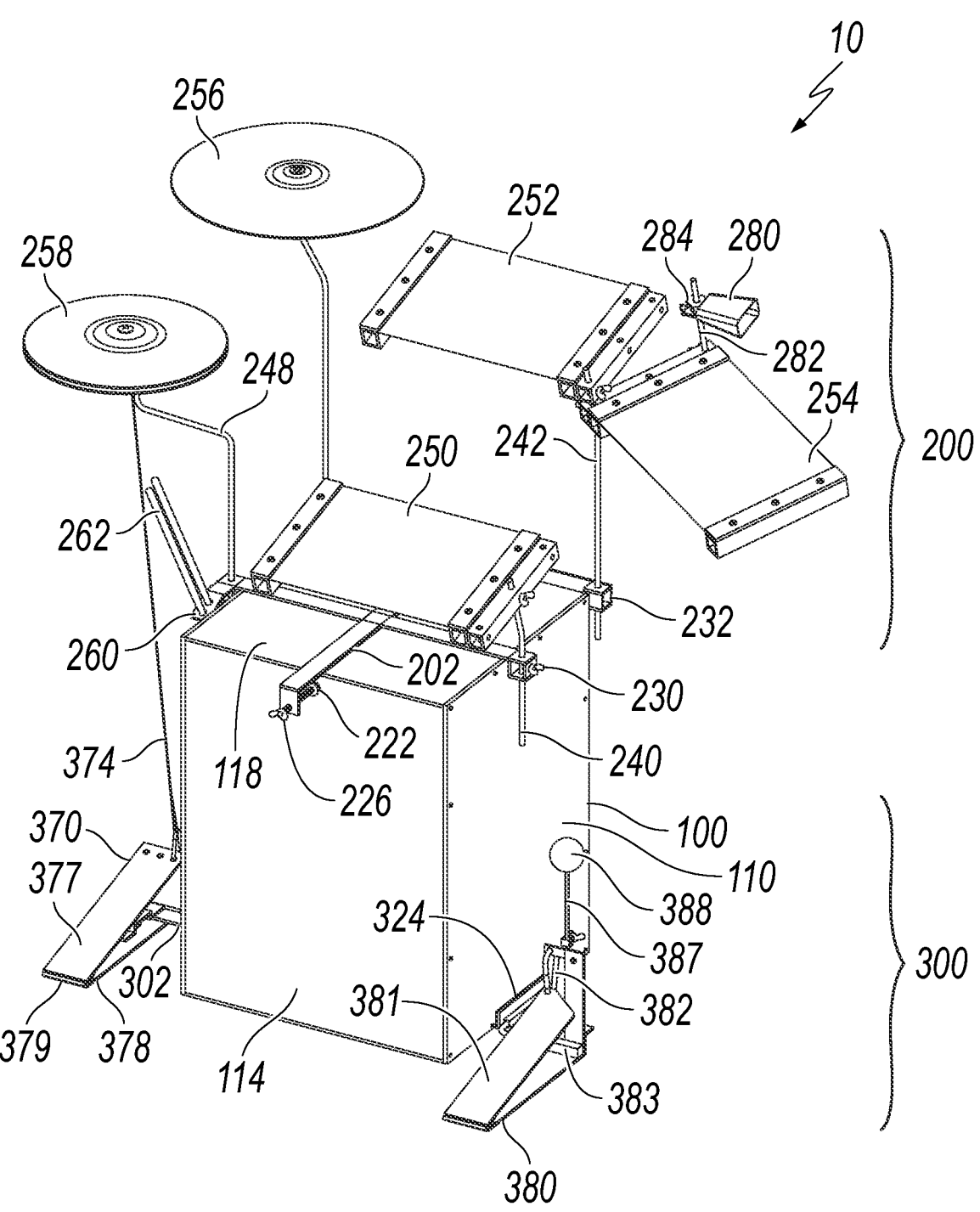
FIG. 1 illustrates a top-front-right perspective view of an exemplary drum set that is in an usage position.
Figure 2:
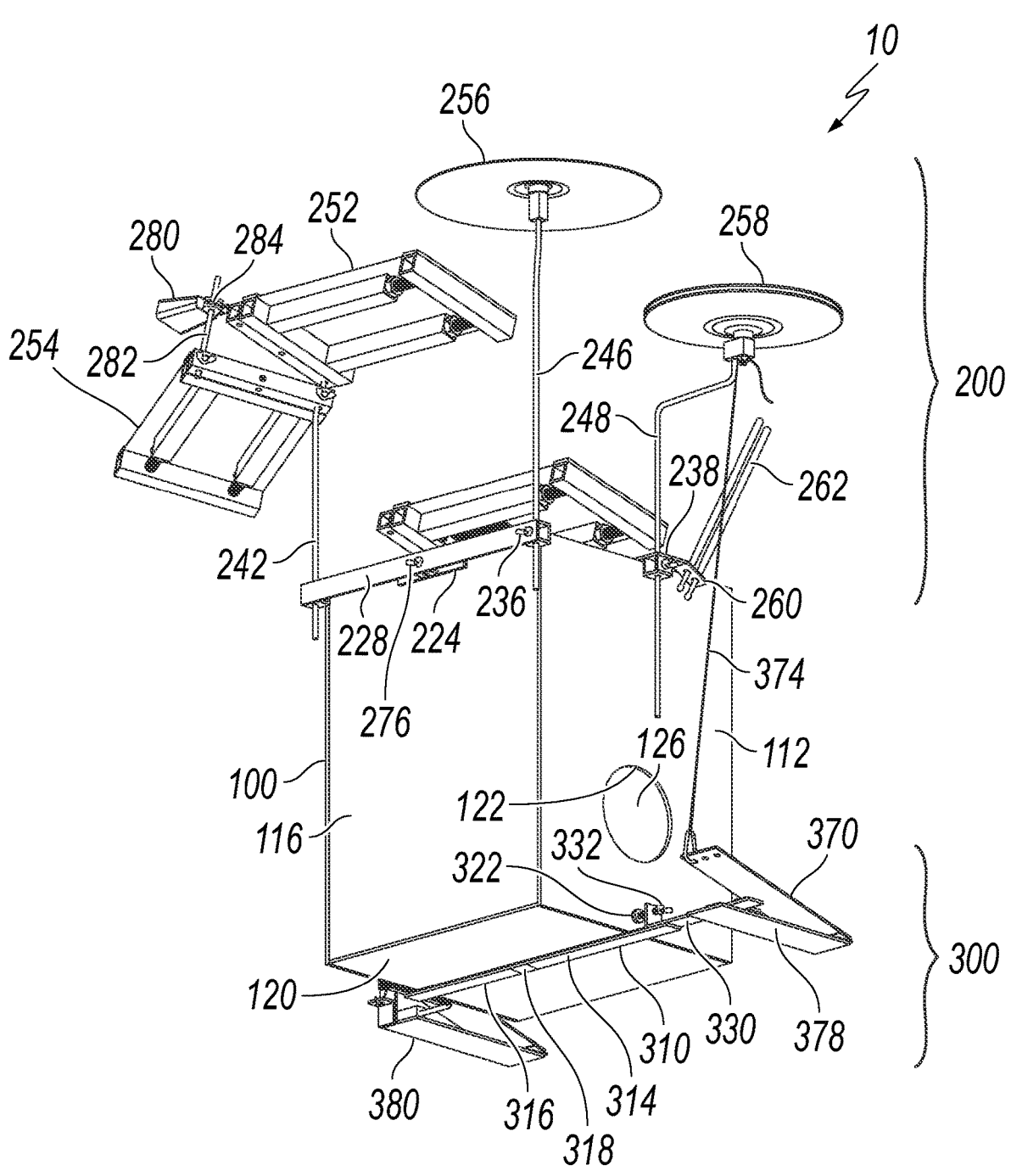
FIG. 2 illustrates a bottom-rear-left perspective view of the exemplary drum set of FIG. 1 showing the bottom module in an usage position.
Figure 3:
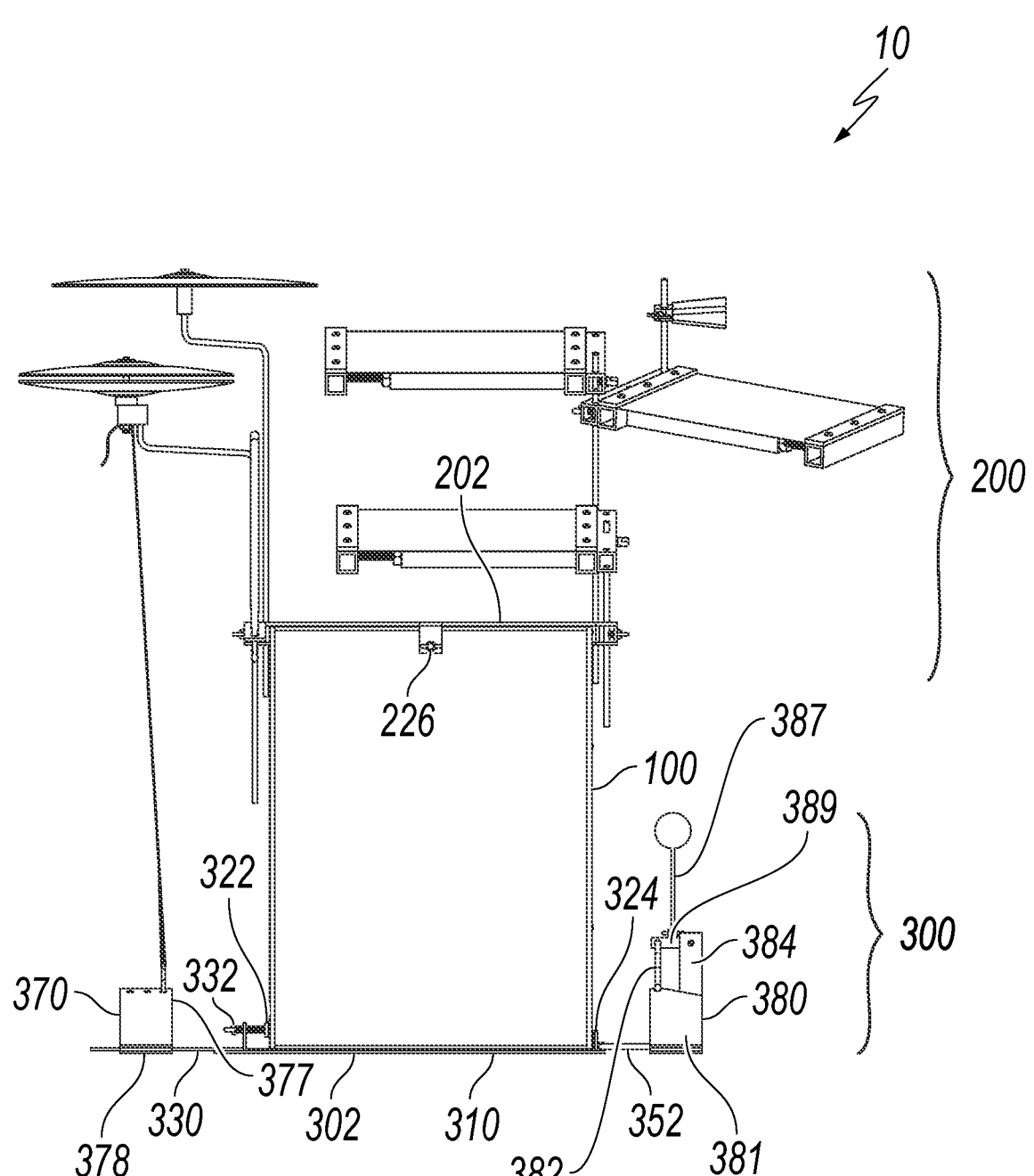
FIG. 3 illustrates a front view of the exemplary drum set of FIG. 1.
Figure 4:
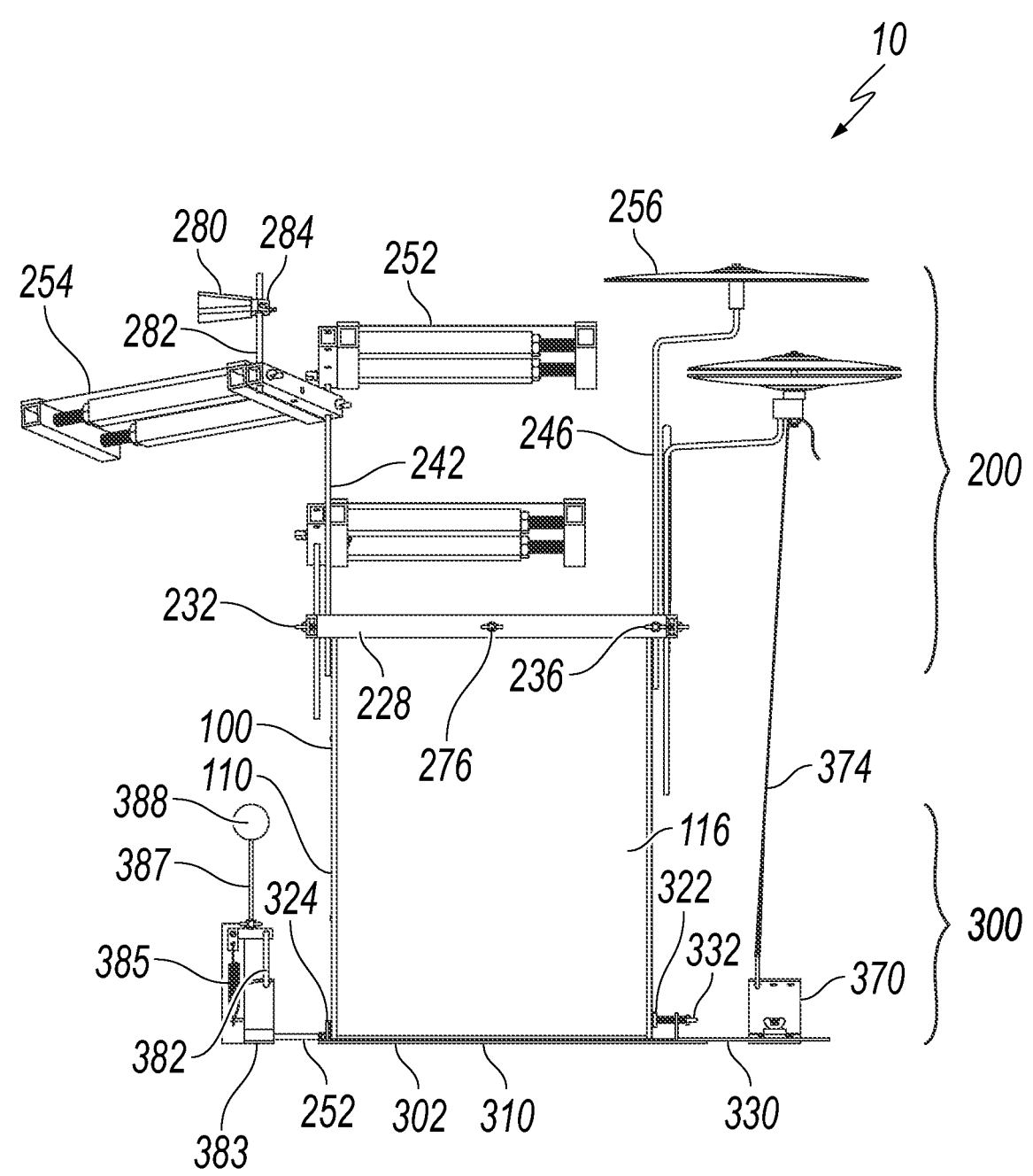
FIG. 4 illustrates a rear view of the exemplary drum set of FIG. 1.
Figure 5:
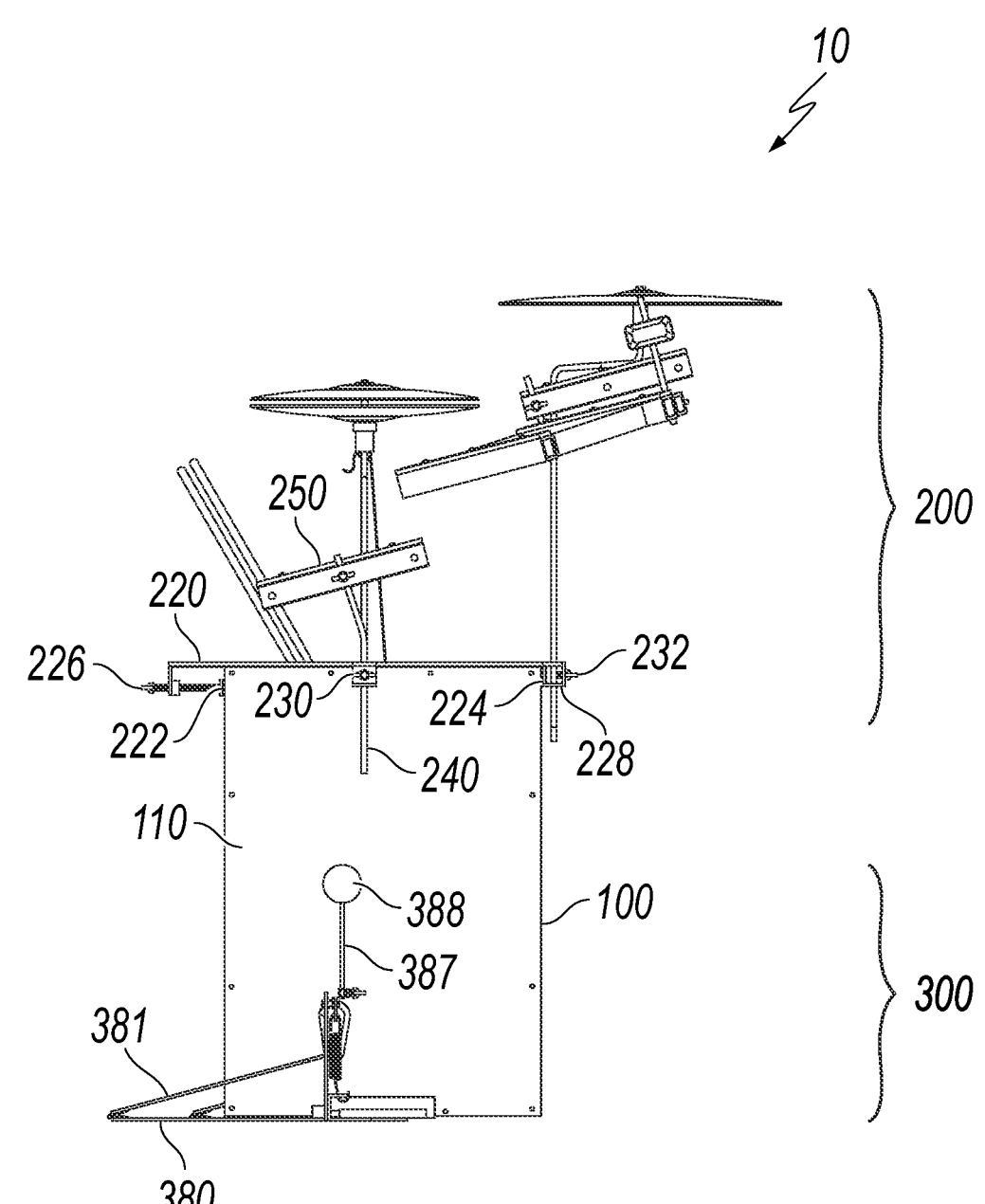
FIG. 5 illustrates a right view of the exemplary drum set of FIG. 1.
Figure 6:
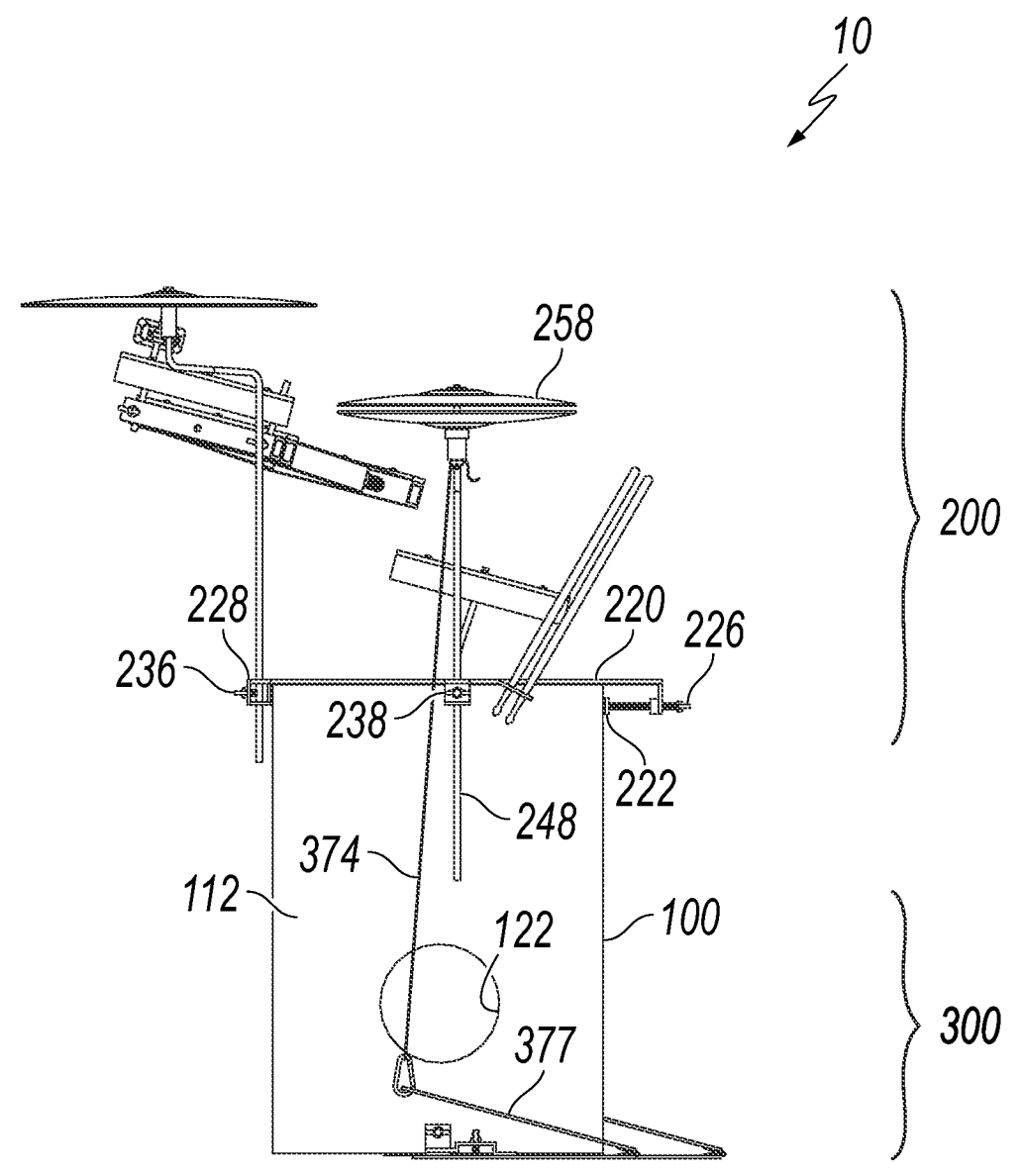
FIG. 6 illustrates a left view of the exemplary drum set of FIG. 1.
Figure 7:
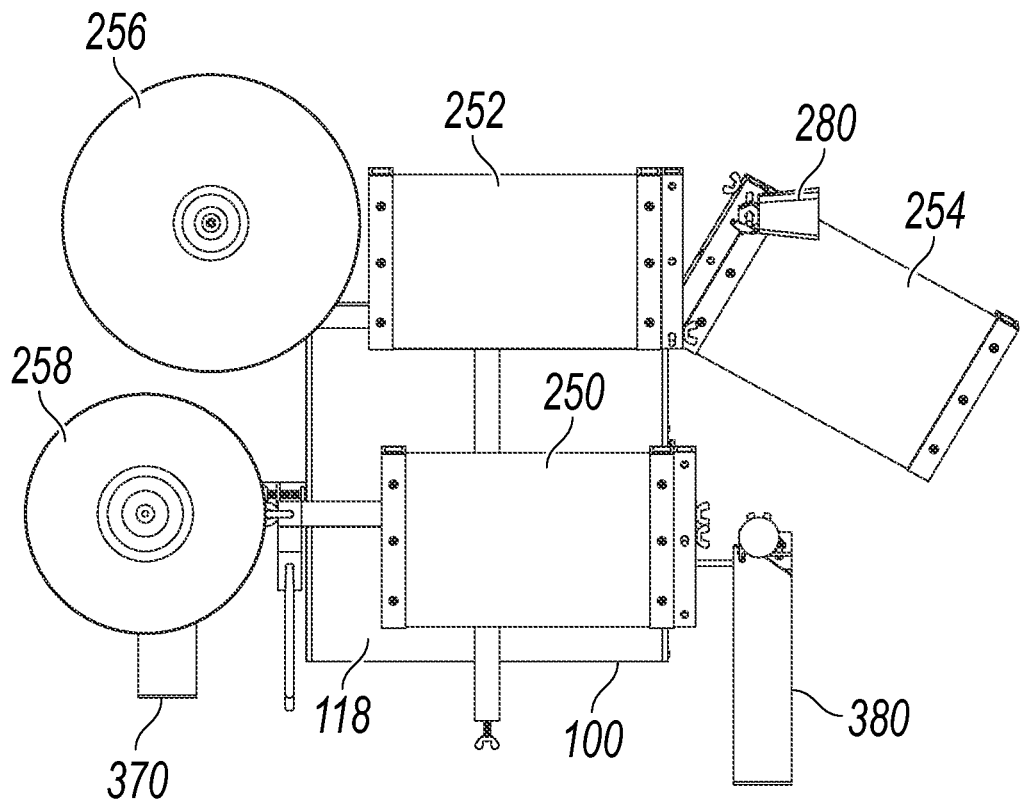
FIG. 7 illustrates a top view of the exemplary drum set of FIG. 1.
Figure 8:
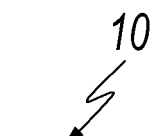
FIG. 8 illustrates a bottom view of the exemplary drum set of FIG. 1.
Figure 8:
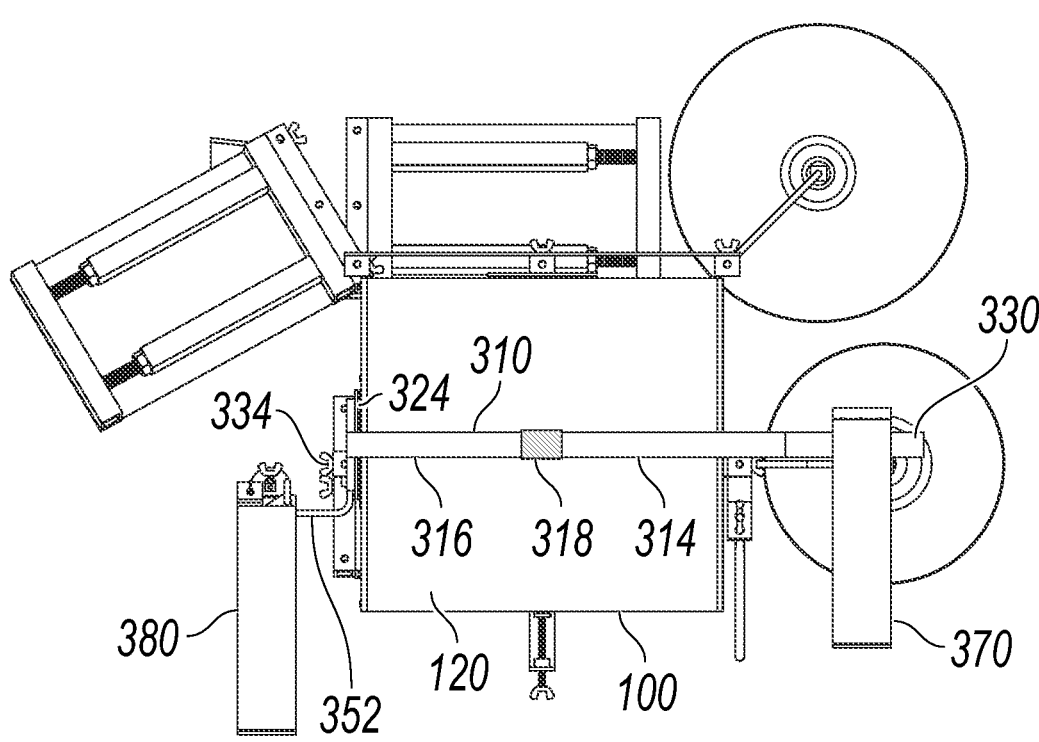
Figure 9:
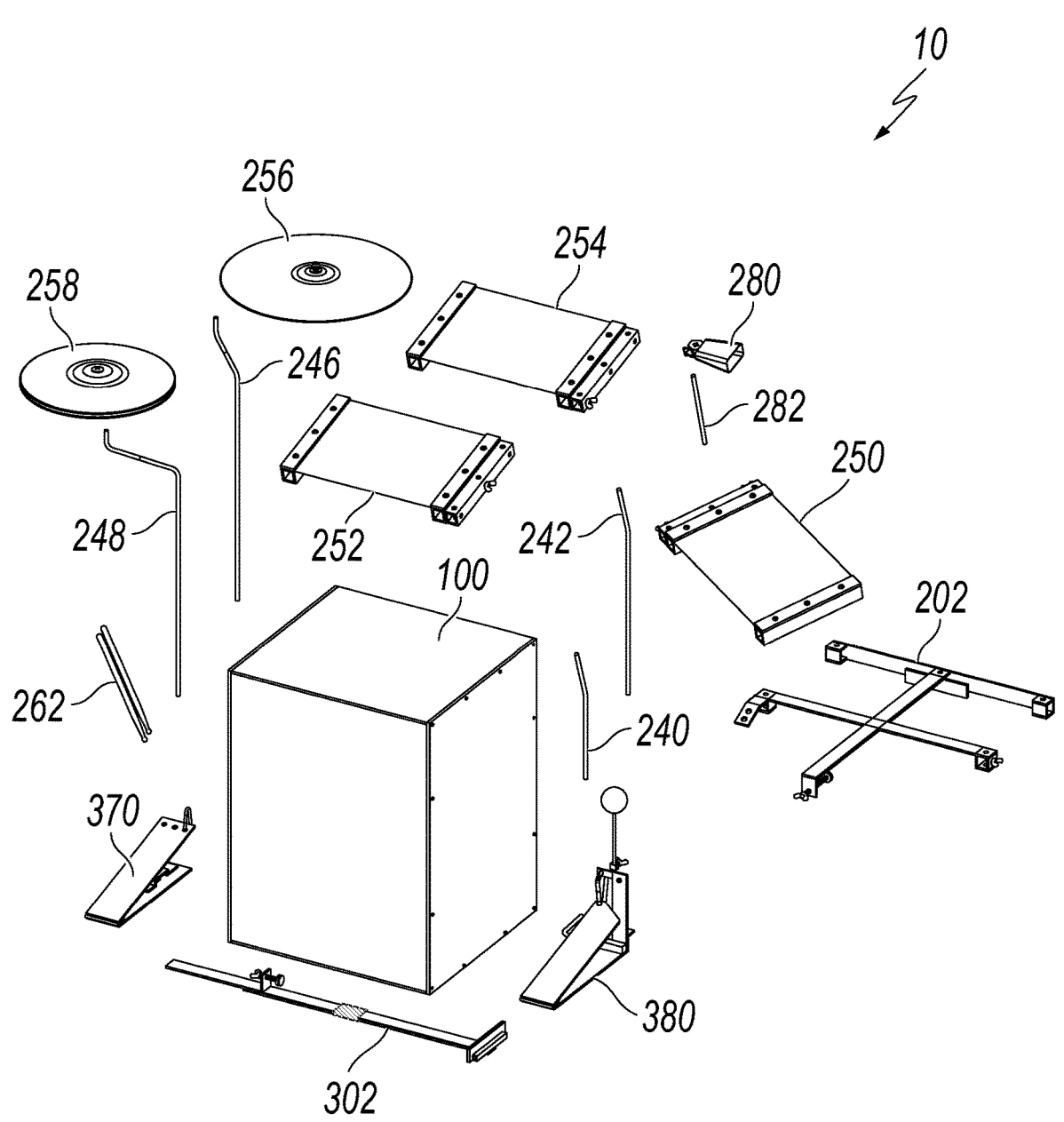
FIG. 9 illustrates a perspective exploded view of the exemplary drum set of FIG. 1.

The following description includes many specific details, the inclusion of which is for the sole purpose of illustration and should not be understood to limit the invention in any way. Moreover, certain features which are known to those of ordinary skill in the art are not described in detail in order to avoid complication of the subject matter of the present invention. In addition, it will be understood that features in an exemplary embodiment may be combined with features in other exemplary embodiments of the invention without limitation.

It is to be understood that the invention is not limited in its application to the exemplary details of construction and to the arrangements of the components set forth in the following description of exemplary embodiments or illustrated in the drawings of exemplary embodiments. The invention is capable of other alternative embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including equivalent constructions to those described herein insofar as they do not depart from the spirit and scope of the present invention.

For example, the specific sequence of the described process may be altered so that certain processes are conducted in parallel or independent, with other processes, to the extent that the processes are not dependent upon each other. Thus, the specific order of steps described herein is not to be considered implying a specific sequence of steps to perform the process. Other alterations or modifications of the above processes are also contemplated. For example, further insubstantial approximations of the process and/or algorithms are also considered within the scope of the processes described herein.

In addition, features illustrated or described as part of one embodiment can be used in or with other embodiments to yield a still further embodiment. Additionally, certain features may be interchanged with similar devices or features now known or later-developed that perform the same or similar functions. It is therefore intended that such modifications and variations are included within the totality of the present invention.

The figures illustrate exemplary embodiments of a family or series of drum set 10 built by a variety of cajon with convertible top and bottom modules, also referred to as the go drum. Reference now will be made in detail to embodiments of the disclosure, one or more examples of which are illustrated in the figures. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

FIGS. 1-9 illustrate a variety of views of an exemplary drum set 10 including cajon base unit 100 with convertible top module 200 and bottom module 300 according to the present disclosure. In particular embodiments, cajon base unit 100 and convertible top and bottom modules 200, 300 form an extremely portable, all-inclusive drum set. Specifically, portability is a particular advantage of cajon base unit 100 with convertible top and bottom modules 200, 300.

Figure 10:
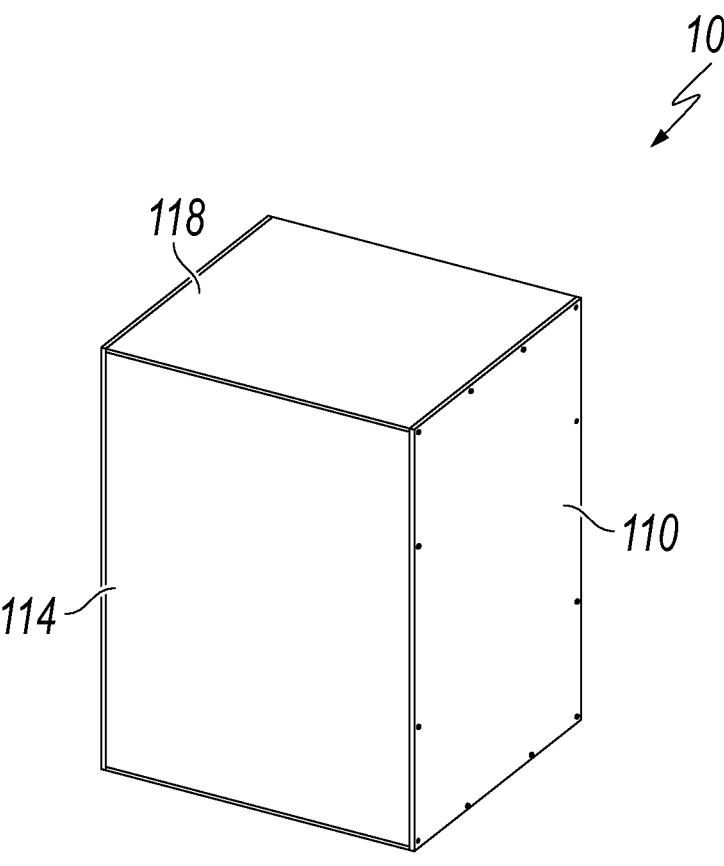
FIG. 10 illustrates top-front-right perspective view of an exemplary cajon of the exemplary drum set of FIG. 1.

Referring also to FIG. 10, cajon base unit 100 can be a traditional cajon or any box-shaped percussion instrument having a hollow interior 126 and may be defined by a right side 110, a left side 112, a front side 114, a rear side 116, a top side 118, and a bottom side 120. Particular embodiments of cajon base unit 100 (hereafter "cajon 100") may be a polyhedron of any three dimensional shape, including, but not limited to, a cube, a cylinder that is round or having a top and bottom of any other polygonal shape, a pyramid that is upright or inverted, whole or bisected, having a base comprising a square or any other polygon, and a cone, whole or bisected. In particular embodiments, cajon 100 may be a box, crate, case, chest, bongo, polygonal with supporting dome, or any other shape in which it would project a sound like a drum when played. In particular embodiments, sides 110, 112, 114, 116 of cajon 100 may be perpendicular to top side 118 and bottom side 120 of cajon 100. Alternatively, sides 110, 112, 114, 116 may be non-perpendicular, at an angle more or less than 90° to top side 118 and bottom side 120 of cajon 100. In particular embodiments, right side 110 or left side 112 of cajon 100 includes a thin plywood.

In particular exemplary embodiments, cajon 100 may be carried by hand hold (not shown). In particular exemplary embodiments, hand hold can be placed on front side 114 and rear side 116 of cajon 100. Nevertheless, hand hold could be placed on any side of body 100. In particular exemplary embodiments, hand hold can comprise an elongated hole in cajon 100. In particular embodiments, there may be one or more hand holds on cajon 100. In particular embodiments, hand hold may be a strap, grip, protrusion, or any other mechanism that enables a person to carry cajon 100.

In particular exemplary embodiments, there are a number of features of cajon 100 to enable cajon 100 to behave as a drum. In particular embodiments, cajon 100 may have one or more sound holes 122 on a side of cajon 100 from which sound emanates depending on whether top or another side of cajon 100 is struck.

As shown in the figures, cajon 100 has a striking side or striking head that may be struck by a beater of a drum kick assembly. In particular embodiments, right side 110 of cajon 100 formed the striking side. When a beater strikes striking head 110, it creates oscillations on striking head 110 and sound waves carrying corresponding frequencies that travel through sound hole 122. In particular embodiments, striking head 110 may comprise any shape, including but not limited to a rectangle, square or other polygon having a plurality of sides. In particular embodiments, striking head 110 may be comprised of the same material as cajon 100. In particular embodiments, striking head 110 may be comprised of mylar. In particular embodiments, striking head 110 may be tunable. In particular embodiments, striking head 110 can be tuned by means of one or more tension rods that run substantially the whole length of one side of the striking head 110. Alternatively, striking head 110 can be tuned by means of one or more tension bolts that protrude a portion along a side of the surface of striking head 110. In particular embodiments, striking head 110 may be tunable and comprised of mylar.

As shown in the figures, cajon 100 has a resonant side or head 112 that is positioned on the opposite side of striking side 110. In particular embodiments, left side 112 of cajon 100 formed the resonant side. When a beater strikes striking head 110, sound waves carrying resonant frequencies due to oscillations of resonant head 112 travel through sound hole 122. In particular embodiments, resonant head 112 is comprised of the same dimension and the same material as striking head 110 to generate corresponding resonant frequency. In particular embodiments, resonant head 112 may be comprised of mylar. In particular embodiments, resonant head 112 may be tunable. In particular embodiments, resonant head 112 can be tuned by means of one or more tension rods that run substantially the whole length of one side of resonant head 112. Alternatively, resonant head 112 can be tuned by means of one or more tension bolts that protrude a portion along a side of the surface of resonant head 112. In particular embodiments, resonant head 112 may be tunable and comprised of mylar.

In particular embodiments, top side 118 of cajon 100 has a top component that may be struck. When top component is struck, sound also travels through sound hole 122. Although in particular embodiments cajon 100 has a sound hole 122 on a particular side of cajon 100, a sound hole may be located on any side of cajon 100. In particular embodiments, cajon 100 may have no sound hole at all or may have any number of sound holes more than one sound hole. In particular embodiments, a sound hole may comprise any size from very small to an entire side or bottom of cajon 100 may be open and functionally behave as a sound hole.

Figure 11:
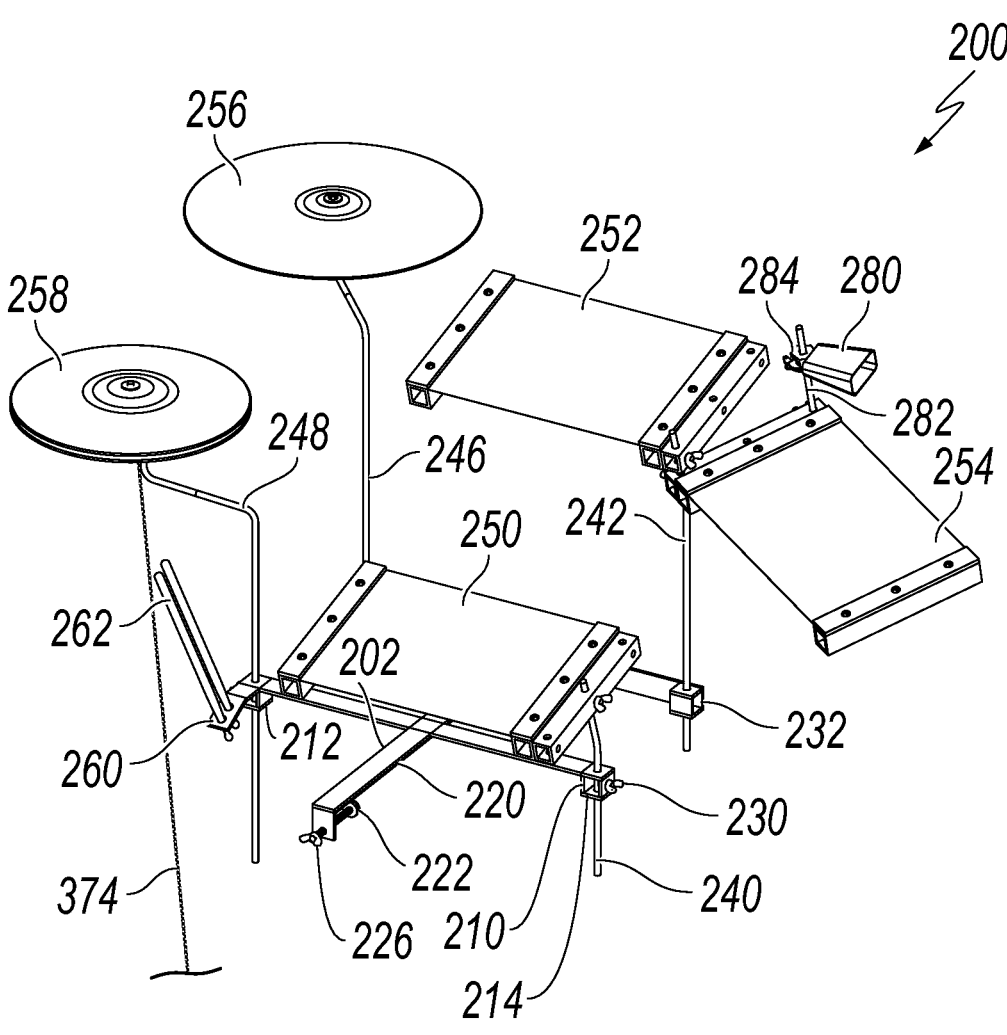
FIG. 11 illustrates a top-front-right perspective view of an exemplary top module of the exemplary drum set of FIG. 1.

Referring also to FIG. 11, in particular exemplary embodiments, a top module 200 is configured to be mounted over cajon 100. In particular exemplary embodiments, top module 200 is sized to cover and extend from the top of cajon 100. In particular exemplary embodiments, top module 200 includes a top mounting member 202.

Figure 13:
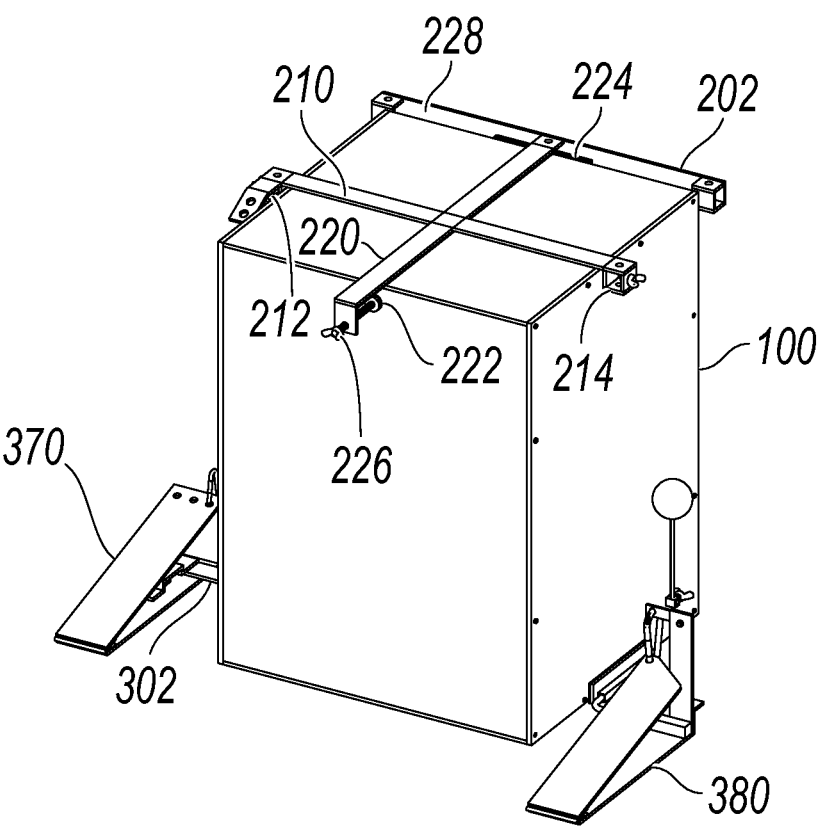
FIG. 13 illustrates a top-front-right perspective view of the exemplary drum set of FIG. 1 with the components and shafts of the top module been removed to show an exemplary top mounting member that is mounted to the top side of cajon.
Figure 14:
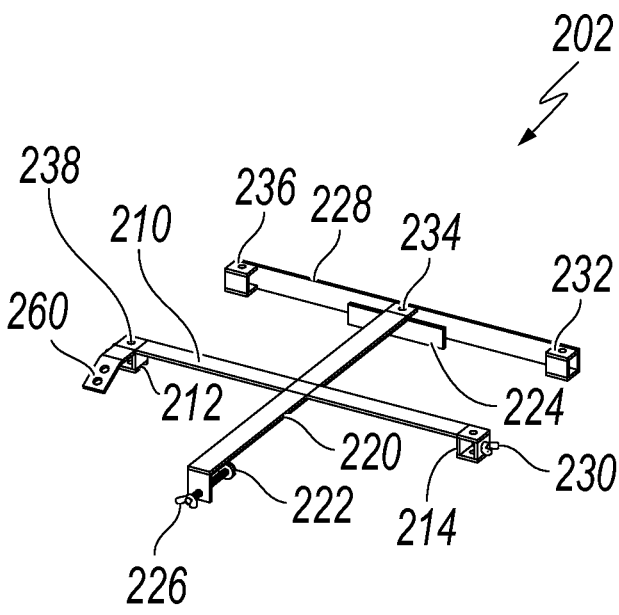
FIG. 14 illustrates a top-front-right perspective view of the exemplary top mounting member.

Referring also to FIGS. 13-14, in particular exemplary embodiments, top mounting member 202 includes one or more top mounting frames 210, 220. Particular embodiments of each of the top mounting frames 210, 220 may be a polyhedron of any three dimensional shape, including, but not limited to, a parallelepiped, a rectangular parallelepiped, a tube, a bar, a cylinder that is round or having a top and bottom of any other polygonal shape with a longitudinal direction. In particular exemplary embodiments, each of the longitudinal direction of mounting frames 210, 220 is perpendicular to the longitudinal direction of the other mounting frame.

In particular exemplary embodiments, mounting frames 210, 220 are fixedly connected to each other. In other embodiments, mounting frames 210, 220 are removably connected to each other. In yet other embodiments, mounting frames 210, 220 are not connected to each other. In some embodiments, additional one or more mounting frames can be provided in addition to mounting frames 210, 220.

In particular embodiments, top mounting frames 210, 220 may be made of any suitable material, including but not limited to wood, carbon fiber, fiberglass, metal, plastic, and the like. In particular embodiments, mounting frames 210,

220 may be made by injection molding, 3-D printing or any other means known to those skilled in the art.

The top mounting frame 210 has a first end and a second end along the longitudinal direction of top mounting frame 210. In particular exemplary embodiments, a first protection pad 212 is provided near the first end of mounting frame 210 and a second protection pad 214 is provided near the second end of mounting frame 210. The first protection pad 212 and second protection pad 214 are configured to work together to provide a cushion between top mounting member and Cajon with the first protection pad 212 and the second protection pad 214 positioned outside of two opposite sides of cajon 100, respectively. As shown in the figures, the first protection pad 212 is positioned over the left side 112 of cajon 100 while the second protection pad 214 is positioned over the right side 110 of cajon 100. In particular exemplary embodiments, the distance between the first protection pad 212 and the second protection pad 214 is configured to accommodate the width or depth of most of commercially available cajons. In some embodiments, the distance between the first protection pad 212 and second protection pad 214 is adjustable.

In some embodiments, each of the first protection pad 212 and the second protection pad 214 can be replaced by, or added with, a clamp that mounting frame 210 can clamp cajon 100 from left side 112 and right side 110 of cajon 100.

The mounting frame 220 has a first end and a second end along the longitudinal direction of mounting frame 220. In particular exemplary embodiments, a first clamp 222 can be provided near the first end of mounting frame 220 and a second clamp 224 can be provided near the second end of mounting frame 220. The first clamp 222 and the second clamp 224 are configured to work together to fasten mounting frame 220 (and the mounting member 202) over the top side of cajon 100 with the first clamp 222 and second clamp 224 clamping two opposite sides of cajon 100, respectively. As shown in the figures, when the top mounting member 202 is mounted over the top side of cajon 100, the first clamp 222 is clamping front side 114 of cajon 100 while the second clamp 224 is clamping rear side 116 of cajon 100.

A distance between the first clamp 222 and second clamp 224 can be adjusted or controlled by a top mounting member locking mechanism 226. In particular embodiments, top mounting member locking mechanism 226 is a clamping screw or clamping nut (e.g., thumb screw or a wing screw). When the top mounting member 202 is placed over cajon 100, cajon 100 can be fastened to or released from, the top mounting member 202 by rotating clamping screw 226 in one direction or another. Although the top mounting member locking mechanism 226 is shown as a thumb screw or a wing screw, the top mounting member locking mechanism 226 may be any suitable locking mechanisms.

In particular exemplary embodiments, a mounting bracket 228 is fixedly or removably couple to mounting frame 220 preferably near the second end of the mounting frame 220. The position of mounting bracket 228 relative to mounting frame 220 can be adjusted or controlled by a mounting frame locking mechanism 276. In particular embodiments, mounting frame locking mechanism 276 is a clamping screw or clamping nut (e.g., thumb screw or a wing screw) configured to fasten to or release mounting bracket 228 from a fixed position relative to mounting bracket 228 to another positions. As shown in figures, mounting bracket 228 is substantially parallel to mounting frame 210, in other embodiments, mounting bracket 228 can be adjusted to form a skew angle with mounting frame 210.

In particular exemplary embodiments, a first component shaft locking mechanism 236 is removably connected to the first end of mounting bracket 228 and a second component shaft locking mechanism 232 is removably connected to the second end of mounting bracket 228.

In particular exemplary embodiments, a stick holder 260 can be in connection with mounting frame 210. The stick holder 260 can be a bracket forming a skew angle with mounting frame 220. Two or more holes can be provided on the bracket and sized to receive drum sticks 262 when sticks are not in use.

In particular exemplary embodiments, component shaft locking mechanisms 238, 230 may be removably connected to the first end and second end of mounting frame 220, respectively.

In particular exemplary embodiments, top mounting frames 210, 220 are removably interconnected to each other. In particular exemplary embodiments, the longitudinal direction of mounting frame 210 is configured to be substantially perpendicular to the longitudinal direction of mounting frame 220 when mounting frames 210, 220 are configured to be securely fastened to each other.

In particular exemplary embodiments, four main component arms or shafts 240, 242, 246, 248 are provided. In other embodiments, more than four main component arms or shafts can be provided.

In particular exemplary embodiments, each of component arms or shafts 240, 248 is configured to be clamped into a desired position by component shaft locking mechanisms 230, 238, respectively, on mounting frame 210. In particular exemplary embodiments, each of component arms or shafts 242, 246 is configured to be clamped into a desired position by component shaft locking mechanisms 232, 236, respectively, on mounting bracket 228.

Each of component shaft locking mechanisms 230, 232, 236, 238 can include a component shaft hole and a clamping screw (e.g., thumb screw or a wing screw). Although component shaft locking mechanisms 230, 232, 236, 238 are shown as a thumb screw or a wing screw, component shaft locking mechanisms 230, 232, 236, 238 may be any suitable locking mechanisms for shafts.

Component shafts 240, 242, 246, 248 can secured into place by component shaft locking mechanisms 230, 232, 236, 238, respectively. Each of component shaft locking mechanisms 230, 232, 236, 238 locks and unlocks to allow corresponding component shafts 240, 242, 246, 248 to move up and/or move down freely or to securely fix component shafts 240, 242, 246, 248 into a particular position. In particular embodiments, each of component shaft locking mechanisms 230, 232, 236, 238 may allow corresponding component shafts 240, 242, 246, 248 to rotate on its lengthwise axis or remain at a fixed rotation relative to Cajon 100 when top module 200 is mounted on Cajon 100. In particular embodiments, there may be more or less component shafts depending on the number of desired components for a particular drum kit 10.

In the exemplary embodiments illustrated in the figures, each of component shafts 240, 242, 246, 248 is straight for at least a portion of its length. The straight portion of each of component shafts 240, 242, 246, 248 is primarily so that component shafts may be locked at various heights. In particular embodiments, component shafts 240, 242, 246, 248 may be entirely straight along its length or any other shape along its length facilitate fastening components to top module 200, and also to Cajon 100.

In the exemplary embodiments illustrated in the figures, each of component shafts 240, 242, 246, 248 is curved for another portion of its length. In particular embodiments, the curved portion of component shafts 240, 242, 246, 248 may be curved in the shape of an "L", or at any other degree or angle in which to allow each of the corresponding components to be extended away and fastened above cajon 100.

Component shafts 240, 242, 246, 248 may be smooth, knurled, or spline. In particular embodiments, a portion of component shafts 240, 242, 246, 248 may be smooth and another portion of component shafts 240, 242, 246, 248 may be knurled. In particular embodiments, component shafts 240, 242, 246, 248 may be smooth, knurled, or spline in its entirety. In particular embodiments, component shafts 240, 242, 246, 248 may be solid or hollow. In particular embodiments, component shafts 240, 242, 246, 248 may be made of any suitable material, including but not limited to wood, carbon fiber, fiberglass, metal, or plastic.

Referring to the figures, drum components 250, 256, 258 are mounted on or removably attached to component arms or shafts 240, 246, 248, respectively.

In particular exemplary embodiments, both drum components 252, 254 are mounted on or removably attached to the same component arm or shaft 242. As shown in the figures, drum component 252 is removably attached to component arm or shaft 242 at a first position while drum component 254 is removably attached to component arm or shaft 242 at a second position that is lower than the first position. Alternatively, components 250, 256, 258 are attached to component shafts 240, 246, 248, respectively, by collar lock, thereby fixing the components in place. In particular embodiments, each of components 250, 256, 258 are sit on top of corresponding component shafts 240, 246, 248, respectively. Although particular components 250, 252, 254, 256, 258 are shown attached to specific component shafts 240, 242, 242, 246, 248, respectively, it is understood by one in the art that each of components may be attached to different component shafts in different configurations.

In particular embodiments, component 250 can be a snare drum. Snare drum 250 has a snare head for accepting striking and an opposing lower skin. In particular embodiments, snare drum 250 may have a frame comprising any shape, including but not limited to a square, rectangle, circle, or other polygon having a plurality of sides. In particular embodiments, snare drum 250 comprises a series of stiff wires held under tension against the lower skin of the snare drum 250. In particular embodiments, snare drum 250 may be composed of mylar. In particular embodiments, snare drum 250 may be tunable. In particular embodiments, snare drum 250 is tuned by means of one or more rods. In particular embodiments, snare drum 250 may be tunable and comprised of mylar.

As is shown in the figures, each of components 252, 254 is attached to component shaft 242 in a stacked manner. In particular exemplary embodiments, components 252, 254 may be one or more tom-tom drums. In particular embodiments, components 252, 254 may be a typical tom-tom drums, including a high tom 252 and a low tom 254. Each of the tom-tom drums 252, 254 may comprise a cylindrical drum with no snares comprising a shell, a rim, and a head. In particular exemplary embodiments, each of the components 252, 254 is a tom-tom comprising a frame and a head. In particular embodiments, each of the tom-tom drums 252, 254 has a head comprising mylar. In particular embodiments, each of the tom-tom drums 252, 254 may be a different size and pitch, such as hi, mid, or low. In particular embodiments, each of the tom-tom drums 252, 254 may have a frame comprising any shape, including but not limited to a square, rectangle, circle, or other polygon having a plurality of sides. In particular embodiments, each of the tom-tom drums 252, 254 may be adjustable so that it may tuned to project sounds of different pitch. In particular embodiments, tom-tom drums 252, 254 can be tuned by means of one or more tension rods.

Additional component or components can be attached to the top module at suitable locations. In particular, smaller size component or components can be attached to components described earlier. As shown in the figures, a cowbell shaft 282 can secured into place of one of the mounting holes of low drum 254. A cowbell locking mechanisms 284 can be configured to lock and unlock to allow a cowbell 280 to move up and/or move down freely or to securely fix into a particular position at cowbell shaft 282.

Figure 17:
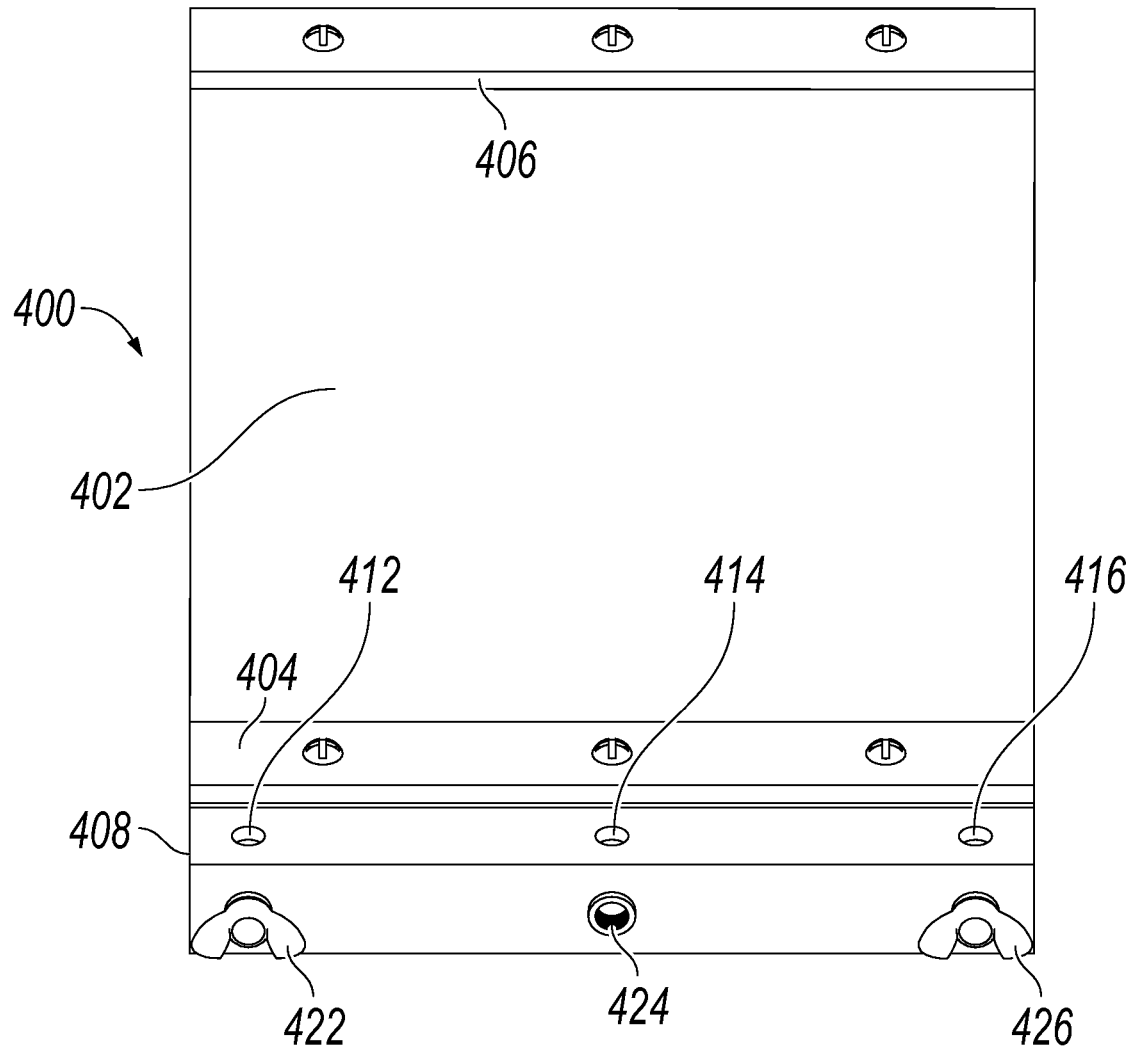
FIG. 17 illustrates a perspective view of an exemplary drum component.
Figure 18:
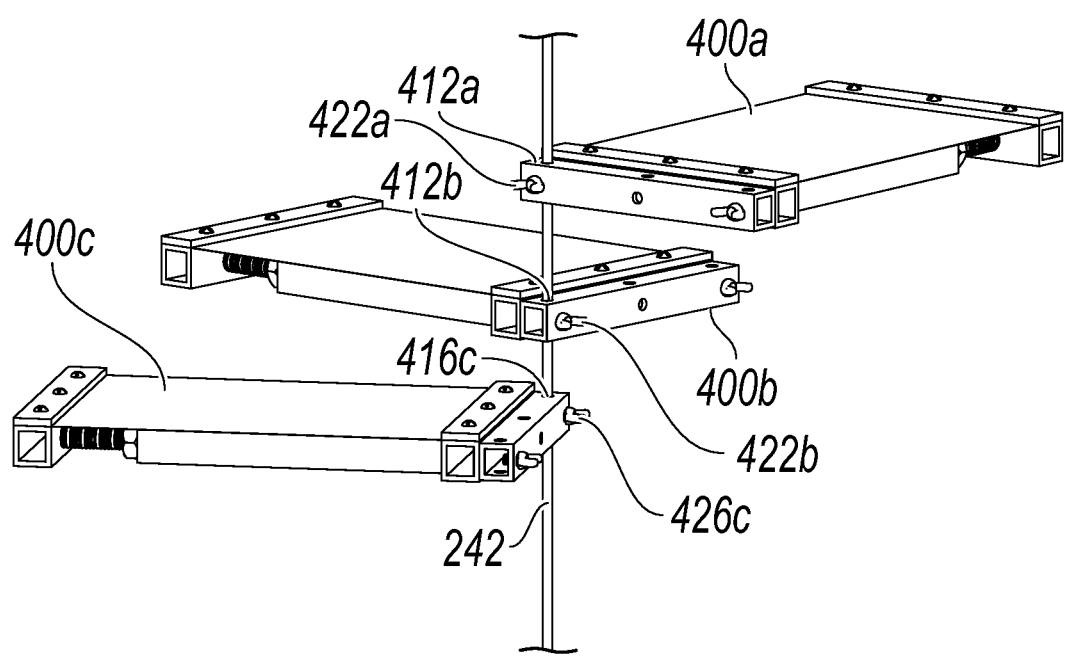
FIG. 18 illustrates a perspective view of an exemplary configuration of stacked drum components.

Referring also to FIGS. 17-18, an exemplary component 400 can comprise a head 402 secured by a frame or separated frames or rims 404, 406. In particular exemplary embodiments, component 400 includes cylindrical head 402. In particular exemplary embodiments, head 402 is comprised of mylar. In particular embodiments, component 400 may be a different size and may include a head 402 having various shapes, including but not limited to square, rectangular, circular, or other polygonal shape having a plurality of sides.

In particular exemplary embodiments, component 400 comprises a first frame 404 and a second frame 406 that is positioned on the opposite side of the first frame 404. One or more rods can be provided, preferably positioned under head 402, to connect and reinforce frames 404, 406. A mounting bar 408 coupled to the second frame 406 can be provided for mounting the component to a shaft or arm. In particular exemplary embodiments, mounting bar 408 comprises mounting holes 412, 414, 416 with the longitudinal direction of holes 412, 414, 416 perpendicular to head 402. Each of the mounting holes 412, 414, 416 has a corresponding mounting mechanism 422, 424, 426. Thus, component 400 can be mounted to a component arm or shaft through hole 412 and secured or loosed by mounting mechanism 422. Alternatively, component 400 can be mounted to a component arm or shaft through hole 416 and secured or loosed by mounting mechanism 426. Alternatively, component 400 can be mounted to a component arm or shaft through hole 414 and secured or loosed by mounting mechanism 424.

Each of the component mounting mechanisms 422, 424, 426 can include a clamping screw (e.g., thumb screw or a wing screw) that when a component shaft is within a corresponding component shaft through hole 412, 414, 416, respectively, component 400 can be fastened to, or released from, the component shaft, a desired position by rotating clamping screw in one direction or another. Although component mounting mechanisms 422, 424, 426 are shown as a thumb screw or a wing screw, component mounting mechanisms 422, 424, 426 may be any suitable locking mechanisms.

Referring to FIG. 18, wherein three components 400a, 400b, 400c are mounted to different locations of the same component shaft 242, simultaneously. Each of the three components 400a, 400b, 400c can have a similar configuration as component 400 of FIG. 17. As shown in FIG. 18, component 400a is mounted to a first location of component shaft 242 through hole 412a and corresponding mounting mechanism 422a, component 400b is mounted to a second location which is lower than the first location of component shaft 242 through hole 412b and corresponding mounting mechanism 422b, and component 400c is mounted to a third location which is lower than the second location of component shaft 242 through hole 416c and corresponding mounting mechanism 426c. Thus, with a single pole or component shaft 242, three components 400a, 400b, 400c (or more if desired) can be stacked and/or arranged in a variety of random or modular combinations.

Each of components 250, 252, 254 shown in FIGS. 1-9 and 11 can incorporate the features described herein in connection with component 400. In addition, stacked components 400a, 400b, 400c shown in FIG. 18 can replace components 250, 252, 254 shown in FIGS. 1-9 and 11, in any order, to form a variety of different configurations of the top module 200.

As is shown in the figures, component 256 is mounted on component shaft 246. In particular exemplary embodiments, component 256 may be a cymbal. In particular embodiments, component 256 may be one or more cymbals. In particular embodiments, component 256 may be a crash, ride, or crash/ride cymbal.

As is shown in the figures, component 258 is mounted on component shaft 248. In particular exemplary embodiments, component 258 may be a pair of hi-hat cymbals.

Figure 12:
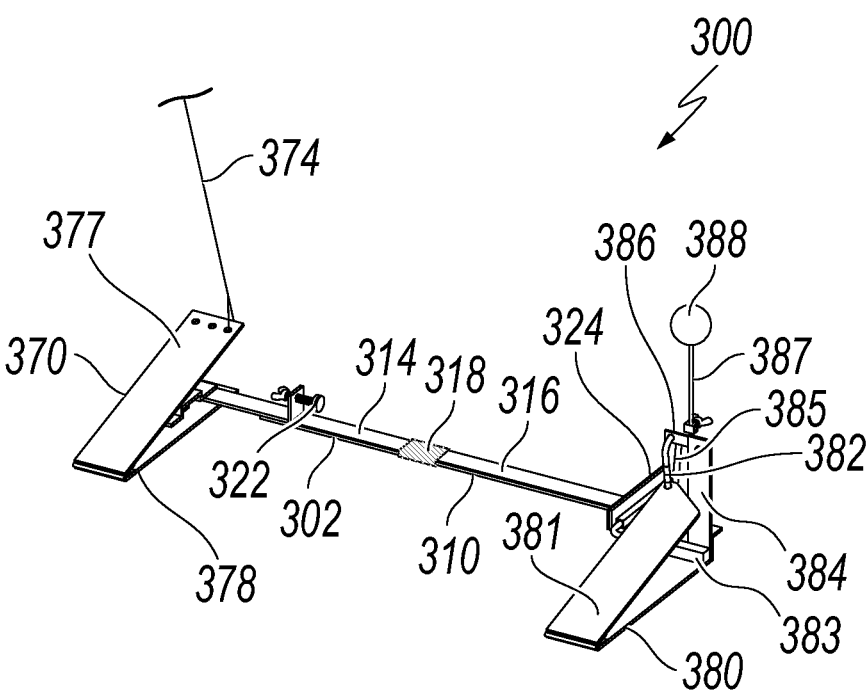
FIG. 12 illustrates a top-front-right perspective view of an exemplary bottom module of the exemplary drum set of FIG. 1.
Figure 15:
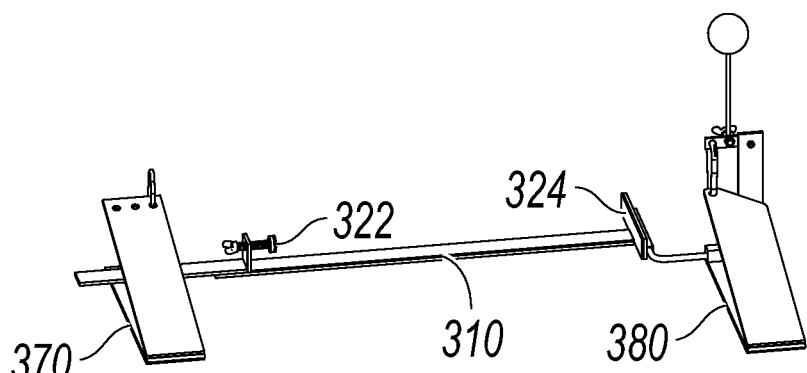
FIG. 15 illustrates a perspective view of another exemplary bottom module of the exemplary drum set of FIG. 1.

Referring also to FIGS. 12 and 15, in particular exemplary embodiments, a bottom module 300 is configured to position under Cajon 100. In particular exemplary embodiments, the bottom module 300 is sized to cover and extend from the bottom of cajon 100. In particular exemplary embodiments, the bottom module 300 includes a bottom mounting member 302.

Figure 16:
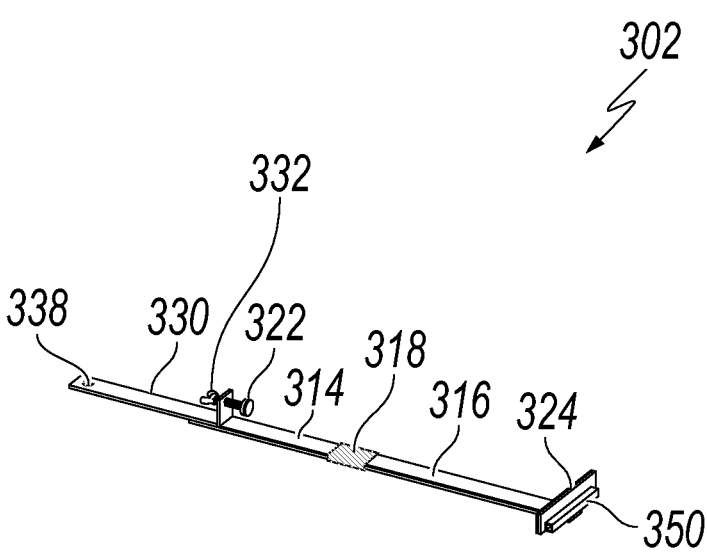
FIG. 16 illustrates a top-front-right perspective view of an exemplary bottom mounting member.

Referring also to FIG. 16, in particular exemplary embodiments, the bottom mounting member 302 includes a main bottom mounting frame 310 and an extended bottom mounting frame 330 that is fixedly attached or removably connected to main bottom mounting frame 310.

In particular exemplary embodiments, main bottom mounting frame 310 may be foldable to reduce the size when in storage mode or in transportation. A joint 318 is configured to have main bottom mounting frame 310 folded in separate pieces 314, 316. In particular embodiments, joint 318 comprises a hinge. In particular embodiments, main bottom mounting frame 310 may be separatable into two or more pieces for storage or when in transportation. In particular embodiments, main mounting frame 310 can be formed as a single rigid, non-foldable piece without a joint. Particular embodiments of main bottom mounting frame 310 may be a polyhedron of any three dimensional shape, including, but not limited to, a parallelepiped, a rectangular parallelepiped, a tube, a bar, a cylinder that is round or having a top and bottom of any other polygonal shape with a longitudinal direction.

In particular exemplary embodiments, extended frame 330 may comprise an L-shaped structure that the long side of the structure is placed in parallel and partially overlayed with main bottom mounting frame 310. The short side of the structure can include a clamp 324 configured to work with another clamp 322 of main bottom mounting frame 310.

Particular embodiments of extended frame 330 may be a polyhedron of any three dimensional shape, including, but not limited to, a parallelepiped, a rectangular parallelepiped, a tube, a bar, a cylinder that is round or having a top and bottom of any other polygonal shape with a longitudinal direction.

In particular embodiments, each of main bottom mounting frame 310 and extended frame 330 may be made of any suitable material, including but not limited to wood, carbon fiber, fiberglass, metal, or plastic, and the like. In particular embodiments, each of main bottom mounting frame 310 and extended frame 330 may be made by injection molding, 3-D printing or any other means known to those skilled in the art.

In particular exemplary embodiments, the longitudinal direction of main bottom mounting frame 310 and longitudinal direction of extended frame 330 are parallel to each other. In particular exemplary embodiments, the longitudinal direction of main bottom mounting frame 310 does not coincided with the longitudinal direction of extended frame 330. In particular exemplary embodiments, extended frame 330 is elevated from main bottom mounting frame 310 that when main mounting frame 310 is placed on the ground, a space can be formed between extended frame 330 and the ground level (here the ground level is flashing with bottom of main mounting frame 310) for accepting a plate 378 from a hi-hat pedal assembly.

The main bottom mounting frame 310 has a first end and a second end along the longitudinal direction of mounting frame 310. In particular exemplary embodiments, a first clamp 322 can be provided near the first end of main bottom mounting frame 310. In particular exemplary embodiments, a second clamp 324 can be provided from extended frame 330 at a location that is near the second end of mounting frame 310. The first clamp 322 and second clamp 324 are configured to work together to fasten main bottom mounting frame 310 (and bottom mounting member 302) under the bottom side of cajon 100 with the first clamp 322 and second clamp 324 clamping two opposite sides of cajon 100, respectively. As shown in the figures, the first clamp 322 is clamping the left side 112 of cajon 100 while the second clamp 324 is clamping the right side 110 of cajon 100.

A distance between the first clamp 322 and second clamp 324 can be adjusted or controlled by a bottom mounting member locking mechanism 332. In particular embodiments, bottom mounting member locking mechanism 332 is a clamping screw or clamping nut (e.g., thumb screw or a wing screw). When bottom mounting member 302 is placed under cajon 100, cajon 100 can be fastened to or released from, bottom mounting member 302 by rotating clamping screw 332 in one direction or another. Although bottom mounting member locking mechanism 332 is shown as a thumb screw or a wing screw, bottom mounting member locking mechanism 332 may be any suitable locking mechanisms.

In particular exemplary embodiments, base plate 378 of hi-hat pedal assembly 370 can be slid and secured under extended frame 330 by a hi-hat pedal assembly locking mechanism 336. The hi-hat pedal assembly locking mechanism 336 can include a clamping screw (e.g., thumb screw or a wing screw) configured to fasten or release base plate 378 of hi-hat pedal assembly 370 to or from extended frame 330. In particular exemplary embodiments, extended frame 330 includes a through hole 338 configured to facilitate a hi-hat pedal assembly hole 372 of base plate 378 to receive hi-hat pedal assembly locking mechanism 336 through the through hole 338.

As is shown in the figures, hi-hat pedal assembly 370 can be positioned to the left of cajon 100 so that a left foot of a drummer may operate hi hat pedal assembly 370 and pulling connector 379, thus, causing component 370 to project sound. In particular embodiments, pulling connector 379 may be a string, rope, cable or wire that is inelastic or elastic or sinewy material.

As is shown in the figures, hi-hat pedal assembly 370 comprises a number of parts, including footboard 377, base plate 378 and connector 379. In particular embodiments, connector 379 may be a heel hinge, such as a heel hinge that connects footboard 377 and base plate 378. In particular embodiments, pulling connector 374 is attached to footboard 377 opposite to connector 374.

As is shown in the figures, drum kick assembly 380 is positioned to the right of cajon 100 so that a right foot of a drummer may operate drum kick assembly 380. In particular embodiments, drum kick assembly 380 has a sliding bar 352 configured to removably attach drum kick assembly 380 to main bottom mounting frame 310 of bottom mounting member 302. In particular embodiments, main bottom mounting frame 310 of bottom mounting member 302 has a slid or hole or channel 350 sized to removably receive sliding bar 352 that when sliding bar 352 is inserted into channel 350, drum kick assembly 380 is secured to bottom mounting member 302. A sliding bar locking mechanism 334 can be provided that sliding bar 352 can be fastened to or released from channel 350. In particular embodiments, the sliding bar locking mechanism 334 includes a pair of wing screws.

In particular exemplary embodiments, drum kick assembly 380 can comprise a number of parts, for example, a drum pedal 381, a pedal rod 382, a kick pedal bar 383, a beater mount 384, a spring 385, a connector 386, a beater extension 387, a beater 388, and a connector rod 389.

In particular embodiments, drum pedal 381 has a heel hinge at one end of drum pedal 381. The other end of drum pedal 381 is attached to one end of the pedal rod 382. The other end of pedal rod 382 can be attached to the connector rod with a lever. One end of the connector rod is attached to one end of beater extension 387 which in turn also attached to beater 388 on the other end. The other end of the connector rod is connected to connector and biased by spring. The connector in turn is also connected to beater mount, which in turn is also connected to kick pedal bar 383.

When drum pedal 381 is pressed downward, it pulls pedal rod 382 downward, which generates an angular force to overcome the spring biased force from the spring to force the connector rod to rotate, which in turn pulls beater extension 387 toward strike side 110 of cajon 100, which causes beater 388 to strike side 110. When drum pedal 381 is released, each moving component of drum kick assembly 380 moves in the opposite direction because the spring force from the spring rotates the connector rod, which in turn pulls beater extension 387 away from the striking side 110, returning drum pedal 381 and beater 388 into their original positions.

Particular embodiments of go drum 10 may be acoustic, electric, or MIDI. With the addition of particular types of pickups strategically placed on cajon 100 and each of the components, particular embodiments of go drum 10 may produce an amplified or digitized sound.

Figure 19:
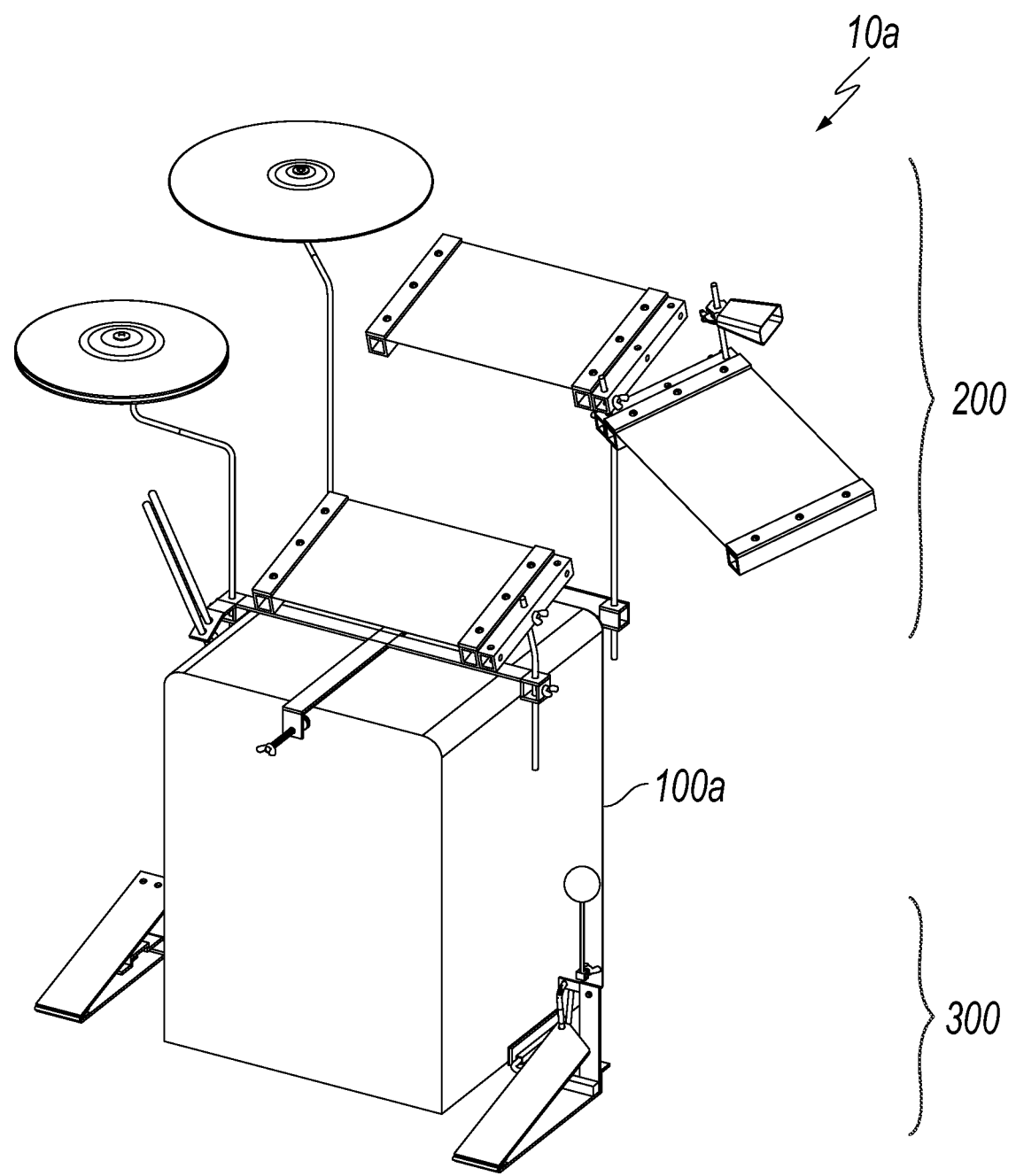
FIG. 19 illustrates a top-front-right perspective view of another exemplary drum set that is in an usage position.
Figure 20:
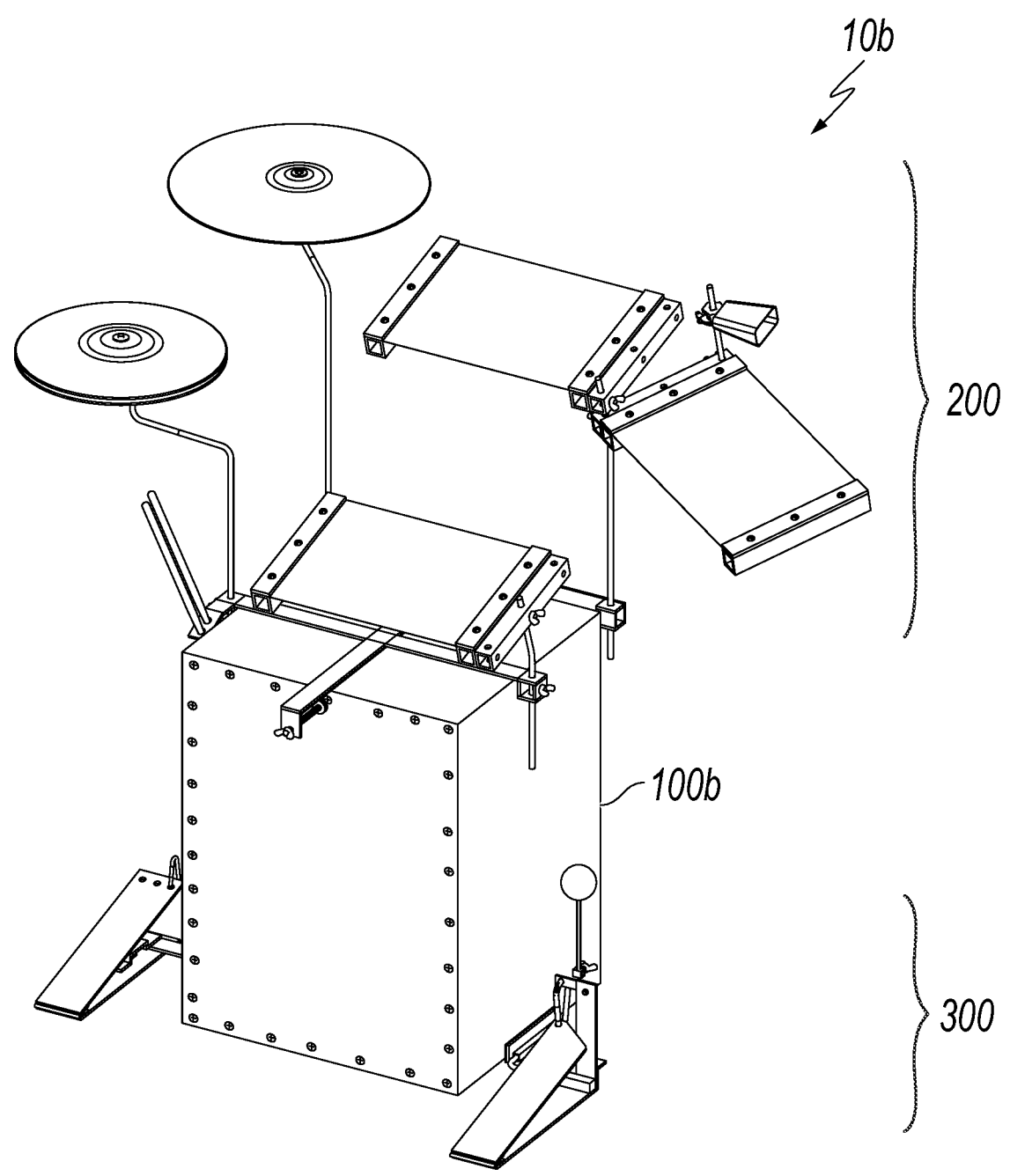
FIG. 20 illustrates a top-front-right perspective view of yet another exemplary drum set that is in an usage position.

FIG. 19 illustrates another exemplary drum kit 10a including cajon 100a, convertible top module 200 and bottom module 300. Drum kit 10a can include identical or substantially the same top module 200 and bottom module 300 as shown in FIGS. 1-9 with the difference that cajon 100a shown in FIG. 19 is different from cajon 100 described in connection with FIGS. 1-9. Similarly, FIG. 20 illustrates yet another exemplary drum kit 10b including Cajon 100b, convertible top module 200 and bottom module 300. The drum kit 10b can include identical or substantially the same top module 200 and bottom module 300 as shown in FIGS. 1-9 with the difference that cajon 100b shown in FIG. 20 is different from cajon 100 described in connection with FIGS. 1-9. Thus, the convertible top module 200 and bottom module 300 described herein can be used to mount on a variety of suitable cajons available to a player to form a variety of drum sets. A suitable cajon can be any cajon that can be removably mounted by the top mounting member 202 and the bottom mounting member 302. In other words, the top module 200 and bottom module 300 described herein can convert a variety of cajons into a family or series of a multi-piece drum sets.

Methods of assembly a drum set that includes one or more of the various foregoing aspects are also encompassed herein. Assembly steps for building a drum set with a cajon and convertible top and bottom modules preferably include: (1) mounting bottom mounting member 302 to cajon 100, (2) mounting hi-hat pedal assembly 370 to bottom mounting member 302, (3) mounting drum kick assembly 380 to bottom mounting member 302, (4) mounting top mounting member 202 to cajon 100, as shown in FIG. 13, (5) mounting one or more of the component shafts 240, 242, 246, 248 to desired locations on the top mounting member 202 with the locking mechanisms 230, 232, 236, 238 as needed, (6) mounting one or more components 250, 252, 254, 256, 258 to desired locations of one or more component shafts 240, 242, 246, 248, and (7) connecting the pulling connector 374 between the hi-hat cymbals component 258 and the hi-hat pedal assembly 370, as shown in FIGS. 1-8. Optionally, the steps may include mounting cowbell 280 to the low tom 254. One or more steps may be omitted if a smaller kit is desired.

In particular embodiments, the step of (1) mounting the bottom mounting member 302 to cajon 100 is performed by adjusting the bottom mounting member locking mechanism 332 to clamp cajon 100 with the first clamp 322 and second clamp 324.

In particular embodiments, the step of (2) mounting the hi-hat pedal assembly 370 to the bottom mounting member 302 is performed by securing the base plate 378 of hi-hat pedal assembly 370 under the extended frame 330 of the bottom mounting member 302 with the hi-hat pedal assembly locking mechanism 336.

In particular embodiments, the step of (3) mounting the drum kick assembly 380 to the bottom mounting member 302 is performed by sliding the sliding bar 352 of the drum kick assembly 380 to the channel 350 of the main bottom mounting frame 310 of the bottom mounting member 302.

In particular embodiments, the step of (4) mounting the top mounting member 202 to Cajon 100 is performed by adjusting the top mounting member locking mechanism 226 to clamp Cajon 100 with the first clamp 222 and second clamp 224.

Disassembly the drum set that includes one or more of the various foregoing aspects can be performed in a reversed order of the processing steps (1)-(7) described above.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

The invention claimed is:

1. A convertible drum set comprising:
a cajon having a top side, a bottom side, a striking side, an opposing resonant side, and two other sides;
a top mounting member removably attached over the top side of the cajon, the top mounting member having at least two top clamps configured to clamp at least two sides of the cajon;
a plurality of upward extending component mounting shafts removably attached to the top mounting member;
one or more percussion modules, each of the one or more percussion modules configured to removably attach to one or more of the plurality of component mounting shafts, wherein each of the one or more percussion modules produces a sound in response to being struck or scraped;
a bottom mounting member removably attached under the bottom side of the cajon, the bottom mounting member having at least two bottom clamps configured to clamp at least two sides of the cajon;
a drum kick assembly removably attached to the bottom mounting member and positioned on the striking side of the cajon and including a beater positioned to strike the striking side of the cajon to produce a sound; and
a hi-hat pedal assembly removably attached to the bottom mounting member and positioned on the resonant side of the cajon.

2. The drum set of claim 1, wherein the top mounting member comprises a first top mounting frame and a second top mounting frame that is substantially perpendicular to the first top mounting frame.

3. The drum set of claim 2, wherein the first top mounting frame is provided with two protection pads configured to provide cushion between the top mounting member and the cajon.

4. The drum set of claim 2, wherein the second top mounting frame is provided with two protection clamps configured to fasten the top mounting frame to the top side of the cajon by clamping the cajon on the two other sides.

5. The drum set of claim 1, wherein each of the plurality of component mounting shafts is supported by a component shaft locking mechanism.

6. The drum set of claim 1, wherein the one or more percussion modules are one or more of a snare drum, a high tom, a low tom, a hi-hat cymbals, and a cymbal.

7. The drum set of claim 6, wherein each of the high tom and the low tom includes a mounting bar having more than one mounting mechanisms configured to mount the high tom and the low tom in a variety of configurations.

8. The drum set of claim 7, wherein the high tom and the low tom are stacked together on the same component mounting shaft.

9. The drum set of claim 6, wherein the snare drum, the high tom and the low tom are stacked together on the same component mounting shaft.

10. The drum set of claim 1, wherein the bottom mounting member comprises a main bottom mounting frame and an L-shaped extended bottom mounting frame that is fixedly attached to the main bottom mounting frame.

11. The drum set of claim 10, wherein a longitudinal direction of the main bottom mounting frame is parallel but not coincided with a longitudinal direction of the extended bottom mounting frame.

12. The drum set of claim 10, wherein the extended bottom mounting frame is elevated from the main bottom mounting frame that when the main bottom mounting frame is placed on the ground, a space is formed between the extended bottom mounting frame and the ground, and wherein the space is configured to accept a plate from a hi-hat pedal assembly.

13. The drum set of claim 10, wherein the main bottom mounting frame is foldable.

14. The drum set of claim 10, wherein each of the main bottom mounting frame and the extended bottom mounting frame includes one of the at least two bottom clamps.

15. The drum set of claim 1, wherein the hi-hat pedal assembly has a footboard, a base plate and a connector connecting the footboard and base plate.

16. The drum set of claim 15, wherein the base plate is accepted underneath the bottom mounting member.

17. A method of assembling a drum set comprising:
preparing a cajon having a top side, a bottom side, a striking side, an opposing resonant side, and two other sides;
mounting a bottom mounting member under the bottom side of the cajon;
mounting a drum kick assembly to the bottom mounting member; and
mounting a hi-hat pedal assembly to the bottom mounting member, wherein a base plate of the hi-hat pedal assembly is positioned under an extension frame of the bottom mounting member.

18. The method of claim 17, further comprising:
mounting a top mounting member over the top side of the cajon;
mounting a plurality of upward extending component mounting shafts to the top mounting member; and mounting one or more components to each of the plurality of upward extending component mounting shafts.

19. The method of claim 18, further comprising:
connecting a pulling connector between a hi-hat cymbals component and the hi-hat pedal assembly.

20. The method of claim 18, further comprising:
mounting a cowbell to the one of the one or more components.

21. A kit for converting a cajon having a top side, a bottom side, a striking side, an opposing resonant side, and two other sides into a drum set, the kit comprising:
a top mounting member removably attached over the top side of the cajon, the top mounting member having at least two top clamps configured to clamp at least two sides of the cajon;
a plurality of upward extending component mounting shafts removably attached to the top mounting member;
one or more percussion modules, each of the one or more percussion modules configured to removably attach to one or more of the plurality of component mounting shafts, wherein each of the one or more percussion modules produces a sound in response to being struck or scraped;
a bottom mounting member removably attached under the bottom side of the cajon, the bottom mounting member having at least two bottom clamps configured to clamp at least two sides of the cajon;
a drum kick assembly removably attached to the bottom mounting member and positioned on the striking side of the cajon and including a beater positioned to strike the striking side of the cajon to produce a sound; and
a hi-hat pedal assembly removably attached to the bottom mounting member and positioned on the resonant side of the cajon.

* * * * *